United States Patent
Yamaguchi et al.

(10) Patent No.: US 10,233,615 B2
(45) Date of Patent: Mar. 19, 2019

(54) POSITION MEASUREMENT SYSTEM AND POSITION MEASUREMENT METHOD

(71) Applicant: Komatsu Ltd., Tokyo (JP)

(72) Inventors: Hiroyoshi Yamaguchi, Hiratsuka (JP); Taiki Sugawara, Hiratsuka (JP); Shun Kawamoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 107 days.

(21) Appl. No.: 15/027,547

(22) PCT Filed: Oct. 15, 2015

(86) PCT No.: PCT/JP2015/079240
§ 371 (c)(1),
(2) Date: Apr. 6, 2016

(87) PCT Pub. No.: WO2016/013691
PCT Pub. Date: Jan. 28, 2016

(65) Prior Publication Data
US 2017/0107698 A1    Apr. 20, 2017

(51) Int. Cl.
*B60R 11/04* (2006.01)
*H04N 7/18* (2006.01)
*E02F 9/26* (2006.01)
*G06T 1/00* (2006.01)
(Continued)

(52) U.S. Cl.
CPC ............ *E02F 9/26* (2013.01); *B60R 11/04* (2013.01); *E02F 9/261* (2013.01); *E02F 9/264* (2013.01); *G01C 21/16* (2013.01); *G06T 1/00* (2013.01); *G06T 7/97* (2017.01); *H04N 7/18* (2013.01); *H04N 7/181* (2013.01); *G06T 2207/10012* (2013.01); *G06T 2207/30244* (2013.01)

(58) Field of Classification Search
None
See application file for complete search history.

(56) References Cited

U.S. PATENT DOCUMENTS

2010/0232684 A1* 9/2010 Fujieda ............... G06T 7/85
382/154
2011/0299761 A1* 12/2011 Myokan ............... G01B 11/26
382/154

(Continued)

FOREIGN PATENT DOCUMENTS

CN    103890282 A    6/2014
JP    2001-043496 A    2/2001
(Continued)

OTHER PUBLICATIONS

International Search Report dated Nov. 24, 2015, issued for PCT/JP2015/079240.

*Primary Examiner* — Kate H Luo
(74) *Attorney, Agent, or Firm* — Locke Lord LLP

(57) ABSTRACT

A position measurement system includes: at least a pair of imaging devices mounted on a work machine; a calculation unit provided at the work machine and configured to perform stereo measurement by using information of an image of an object captured by at least the pair of imaging devices; and a determination unit configured to determine condition related to image capturing by the imaging device based on a performance result of the stereo measurement.

13 Claims, 7 Drawing Sheets

(51) Int. Cl.
    *G01C 21/16*     (2006.01)
    *G06T 7/00*     (2017.01)

(56) References Cited

U.S. PATENT DOCUMENTS

| | | | | |
|---|---|---|---|---|
| 2013/0147948 A1* | 6/2013 | Higuchi | ............ | H04N 13/0246 |
| | | | | 348/135 |
| 2013/0182066 A1* | 7/2013 | Ishimoto | ................ | H04N 7/181 |
| | | | | 348/38 |
| 2013/0222554 A1* | 8/2013 | Hayashi | ............... | H04N 13/021 |
| | | | | 348/50 |
| 2014/0362220 A1* | 12/2014 | Izumikawa | ............. | G01S 17/89 |
| | | | | 348/148 |
| 2015/0009329 A1 | 1/2015 | Ishimoto | | |
| 2015/0103147 A1* | 4/2015 | Ho | ............................ | G06T 7/85 |
| | | | | 348/47 |
| 2015/0213588 A1* | 7/2015 | Wang | ....................... | G06T 7/002 |
| | | | | 348/47 |
| 2015/0269737 A1* | 9/2015 | Lam | ................... | H04N 13/0011 |
| | | | | 382/154 |

FOREIGN PATENT DOCUMENTS

| | | | |
|---|---|---|---|
| JP | 2006-313498 A | 11/2006 |
| JP | 2007-037011 A | 2/2007 |
| JP | 2008-101416 A | 5/2008 |
| JP | 2009-239485 A | 10/2009 |
| JP | 2013-036243 A | 2/2013 |
| JP | 2014-224411 A | 12/2014 |

\* cited by examiner

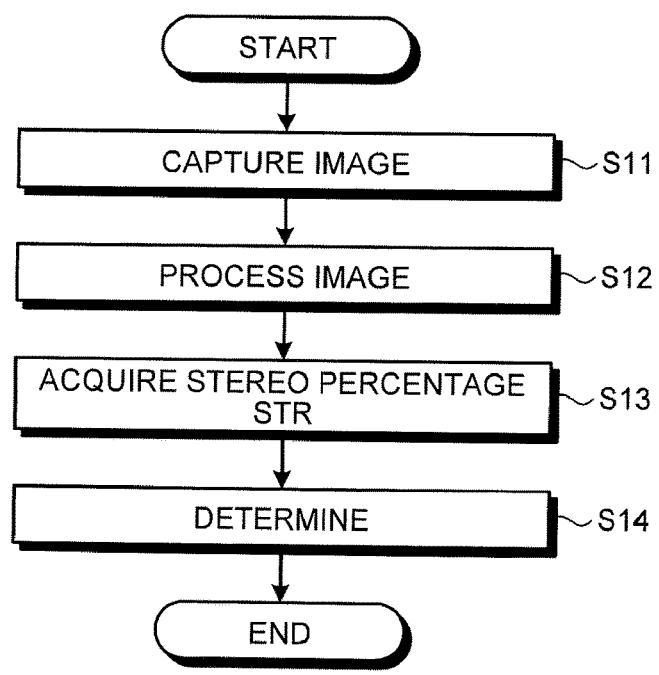

POSITION MEASUREMENT SYSTEM AND POSITION MEASUREMENT METHOD

FIELD

The present invention relates to a position measurement system and a position measurement method.

BACKGROUND

There is a work machine that includes a stereo camera and detects a position of an object by the stereo camera. Patent Literature 1 discloses a technology in which image data of a construction plan is created based on construction plan data stored in a storage unit and positional information of a stereo camera, the image data of the construction plan and current image data captured by the stereo camera are superimposed, and the superimposed composite image is three-dimensionally displayed on a three-dimensional display unit.

CITATION LIST

Patent Literature

Patent Literature 1: Japanese Laid-open Patent Publication No. 2013-036243

SUMMARY

Technical Problem

Meanwhile, in the case where an imaging device constituting a stereo camera captures an image of an object, measurement by the stereo camera may be influenced by a peripheral environment. For example, in the case where a peripheral environment of the imaging device is rainy, snowy, or the like, there may be possibility that measurement cannot be performed by the stereo camera or accuracy of measurement is deteriorated. Patent Literature 1 does not suggest any thing about grasping condition at the time when the imaging device constituting the stereo camera captures an image. Therefore, there is still room for improvement.

The present invention is directed to grasping the condition at the time when an imaging device constituting a stereo camera captures an image.

Solution to Problem

According to the present invention, a position measurement system comprises: at least a pair of imaging devices mounted on a work machine; a calculation unit provided at the work machine and configured to perform stereo measurement by using information of an image of an object captured by at least the pair of imaging devices; and a determination unit configured to determine condition related to image capturing by the imaging devices based on a performance result of the stereo measurement.

In the present invention, it is preferable that the calculation unit is configured to perform stereo measurement for a specific range where a pattern is located inside the image.

In the present invention, it is preferable that the determination unit is configured to determine a state between the imaging device and an object captured by the imaging device based on the performance result.

In the present invention, it is preferable that the determination unit is configured to determine a posture of the imaging device based on the performance result.

In the present invention, it is preferable that at least the pair of imaging devices having an optical axis oriented upward is disposed.

In the present invention, it is preferable that the determination unit is provided at a management device outside the work machine, and the calculation unit is configured to output the performance result of the stereo measurement to the determination unit provided at the management device.

In the present invention, it is preferable that the management device is configured to determine a handling matter based on the determination result on the condition related to image capturing.

In the present invention, it is preferable that the determination unit is provided at the work machine.

In the present invention, it is preferable that the work machine includes a control unit configured to determine a handling matter based on the determination result on the condition related to image capturing.

According to the present invention, a position measurement method comprises: capturing an image of an object by at least a pair of imaging devices mounted on a work machine; performing stereo measurement by using information of an image of the object captured by at least the pair of imaging devices; and determining condition related to image capturing by the imaging devices based on a performance result of the stereo measurement.

In the present invention, it is preferable that a determination result is output after determining the condition related to image capturing.

In the present invention, it is preferable that a handling matter is determined based on the determination result on the condition related to image capturing.

According to the present invention, it is possible to grasp the condition at the time when the imaging device constituting the stereo camera captures an image.

BRIEF DESCRIPTION OF DRAWINGS

FIG. 9 is a flowchart illustrating an exemplary process of a position measurement method according to the embodiment.

DESCRIPTION OF EMBODIMENTS

A mode to implement (embodiment of) the present invention will be described with reference to the drawings.

<Entire Structure of Excavator>

Figure 1:
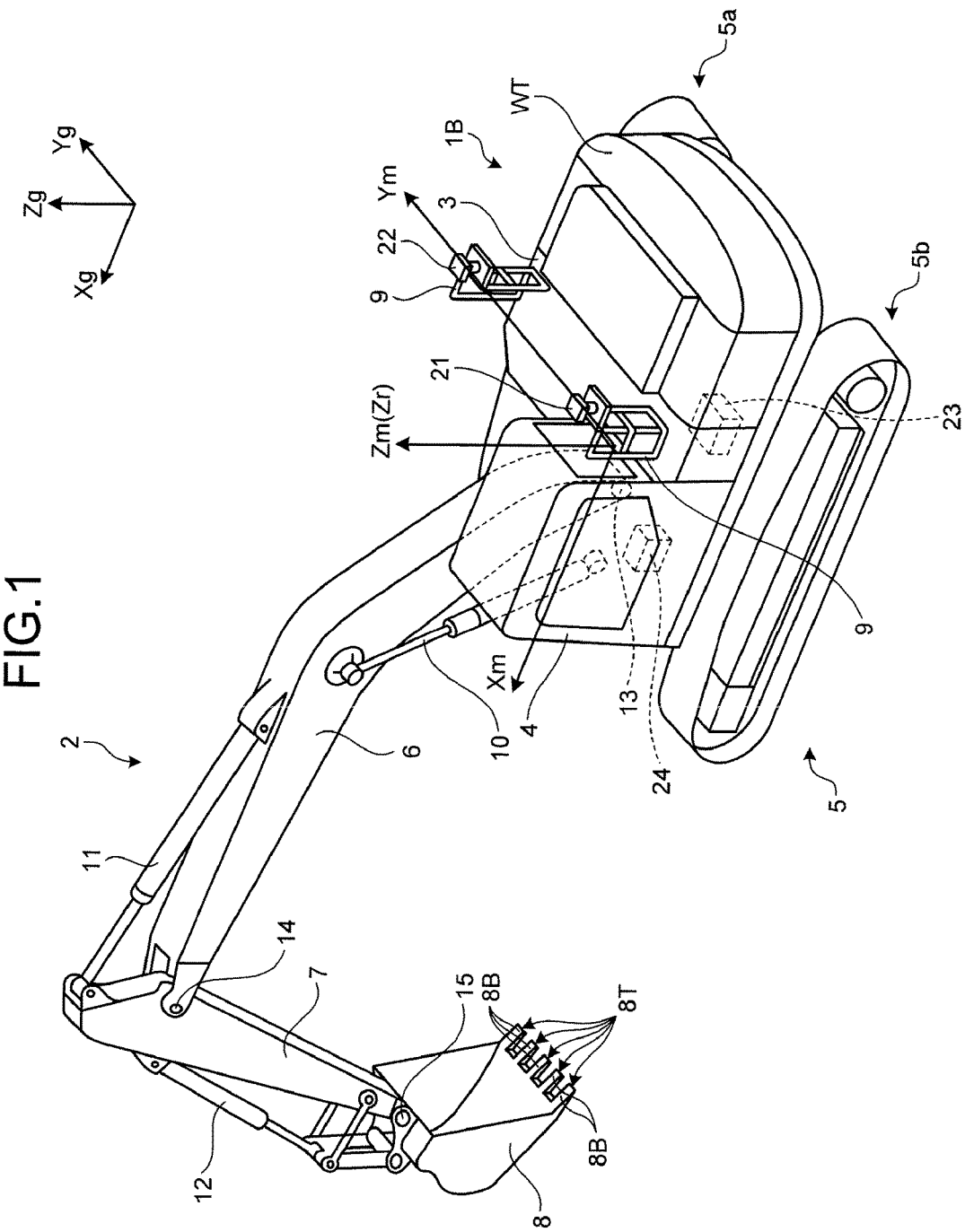
FIG. 1 is a perspective view illustrating an excavator including a control system of an imaging device according to an embodiment.
Figure 2:
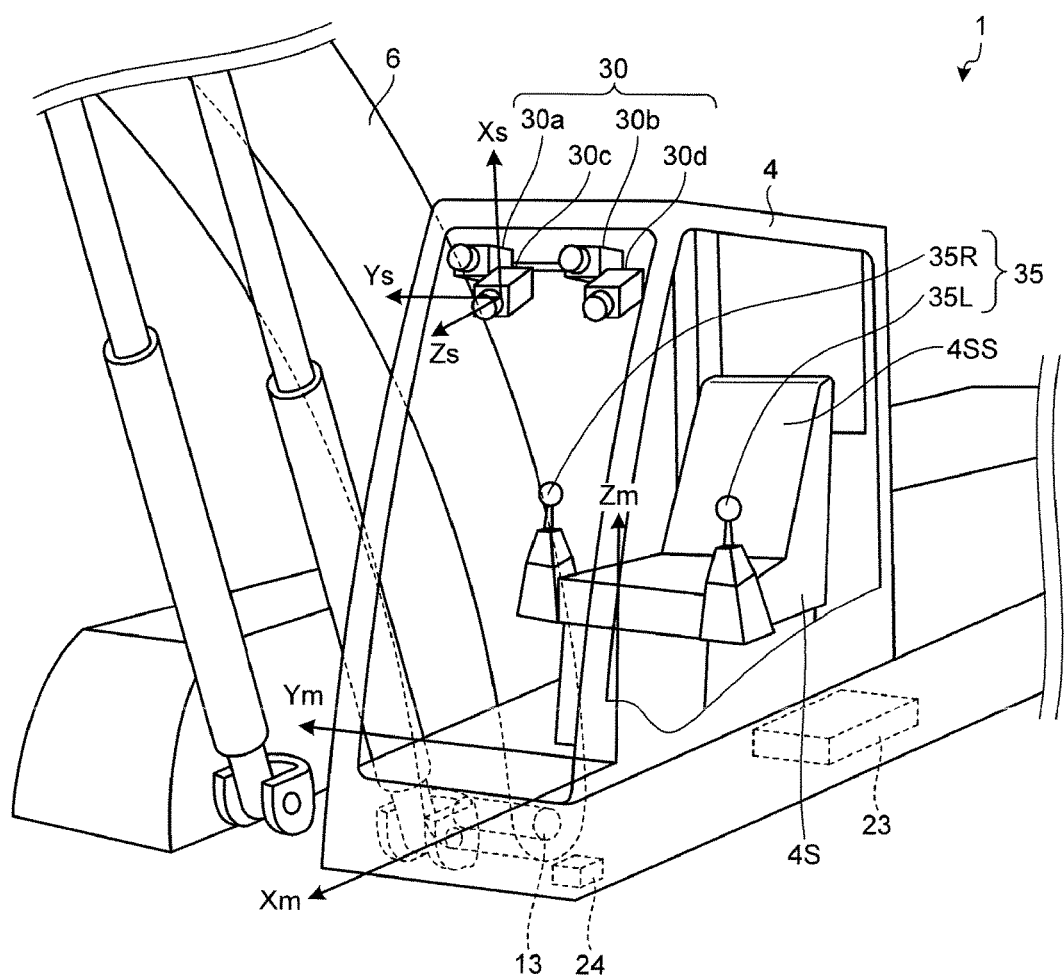
FIG. 2 is a perspective view illustrating a peripheral area of an operator's seat of the excavator according the embodiment.

FIG. 1 is a perspective view illustrating an excavator 1 including a control system of an imaging device according to an embodiment. FIG. 2 is a perspective view illustrating a peripheral area of an operator's seat of the excavator 1 according the embodiment. The excavator 1 that is a work machine includes a vehicle body 1B and a work unit 2. The vehicle body 1B includes a swing body 3, an operating room 4, and a traveling body 5. The swing body 3 is mounted on the traveling body 5 in a swingable manner centering a swing center axis Zr. The swing body 3 houses devices such as a hydraulic pump and an engine.

The swing body 3 swings with the work unit 2 attached. A hand rail 9 is mounted on an upper portion of the swing body 3. Antennas 21, 22 are mounted on the hand rail 9. The antennas 21, 22 are antennas for real time kinematic-global navigation satellite systems (RTK-GNSS). The antennas 21, 22 are arranged separate from each other at a predetermined interval in an Ym-axis direction of a vehicle body coordinate system (Xm, Ym, Zm). The antennas 21, 22 receive GNSS radio waves and output signals corresponding to the GNSS radio waves. The antennas 21, 22 may be antennas for a global positioning system (GPS).

The operating room 4 is disposed at a front portion of the swing body 3. The traveling body 5 includes crawlers 5a, 5b. The excavator 1 travels by rotation of the crawlers 5a, 5b.

The work unit 2 is mounted on a front portion of the vehicle body 1B, and includes a boom 6, an arm 7, a bucket 8, a boom cylinder 10, an arm cylinder 11, and a bucket cylinder 12. The front portion of the vehicle body 1B is a portion on an opposite side of a counter weight WT of the vehicle body 1B. According to the embodiment, a front side of the vehicle body 1B is a side directed to an operation unit 35 from a backrest 4SS of an operator's seat 4S illustrated in FIG. 2. A rear side of the vehicle body 1B is a side directed from the operation unit 35 to the backrest 4SS of the operator's seat 4S. The operation unit 35 is a unit to operate the work unit 2 and the swing body 3, and includes a right lever 35R and a left lever 35L.

A base end portion of the boom 6 is rotatably mounted on the front portion of the vehicle body 1B via a boom pin 13. More specifically, the boom pin 13 corresponds to a rotary center of the boom 6 relative to the swing body 3. A base end portion of the arm 7 is rotatably mounted on a tip portion of the boom 6 via an arm pin 14. More specifically, the arm pin 14 corresponds to a rotary center of the arm 7 relative to the boom 6. The bucket 8 is rotatably mounted on a tip portion of the arm 7 via a bucket pin 15. More specifically, the bucket pin 15 corresponds to a rotary center of the bucket 8 relative to the arm 7.

The boom cylinder 10, arm cylinder 11, and bucket cylinder 12 illustrated in FIG. 1 are respectively hydraulic cylinders driven by hydraulic pressure. The boom cylinder 10 is extended/contracted by hydraulic pressure, thereby driving the boom 6. The arm cylinder 11 is extended/contracted by hydraulic pressure, thereby driving the arm 7. The bucket cylinder 12 is extended/contracted by hydraulic pressure, thereby driving bucket 8.

The bucket 8 includes a plurality of blades 8B. The plurality of blades 8B is aligned in a width direction of the bucket 8. The width direction of the bucket 8 is a direction parallel to an extending direction of the bucket pin 15. A tip of blade 8B is a blade tip 81. The bucket 8 is an exemplary operating tool. The operating tool is not limited to the bucket 8. The operating tool may be, for example, a tilt bucket including a single blade, a slope bucket, a rock drilling attachment including a rock drilling chip, or an operating tool other than these.

The swing body 3 includes a position detector 23 and an inertial measurement unit (IMU) 24 that is an exemplary posture detector. The position detector 23 receives signals from the antennas 21, 22. The position detector 23 detects and outputs current positions of the antennas 21, 22 in a global coordinate system (Xg, Yg, Zg) and an azimuth direction of the swing body 3 by using the signals acquired from the antennas 21, 22. The azimuth direction of the swing body 3 represents an orientation of the swing body 3 in the global coordinate system. The orientation of the swing body 3 can be represented by, for example, an orientation in a front-rear direction of the swing body 3 around a Zg-axis in the global coordinate system. An azimuth angle is a rotational angle of a reference axis in the front-rear direction of the swing body 3 around the Zg-axis in the global coordinate system. The azimuth direction of the swing body 3 is represented by the azimuth angle. According to the embodiment, the position detector 23 calculates the azimuth angle from relative positions of the two antennas 21, 22.

<Imaging Device>

As illustrated in FIG. 2, the excavator 1 includes a plurality of imaging devices 30a, 30b, 30c, 30d inside the operating room 4. The plurality of imaging devices 30a, 30b, 30c, 30d is an exemplary detector to detect a shape of an object. In the following, the plurality of imaging devices 30a, 30b, 30c, 30d will be referred to as an imaging device 30 in the case of not discriminating each one of the imaging devices. Among the plurality of imaging devices 30, the imaging device 30a and the imaging device 30c are disposed on the work unit 2 side. A type of the imaging device 30 is not limited, but according to the embodiment, an imaging device including a couple charged device (CCD) image sensor or a complementary metal oxide semiconductor (CMOS) image sensor is used.

As illustrated in FIG. 2, the imaging device 30a and the imaging device 30b are disposed inside the operating room 4 distant from each other at a predetermined interval, and oriented in a same direction or different directions. The imaging device 30c and the imaging device 30d are disposed inside the operating room 4 distant from each other at a predetermined interval, and oriented in a same direction or different directions. Two of the plurality of imaging devices 30a, 30b, 30c, 30d are combined and constitutes a stereo camera. According to the embodiment, a stereo camera is formed by combining the imaging devices 30a, 30b and another stereo camera is formed by combining the imaging devices 30c, 30d. According to the embodiment, the imaging device 30a and the imaging device 30b are oriented upward, and the imaging device 30c and the imaging device 30d are oriented downward. At least the imaging device 30a and the imaging device 30c are oriented to the front side of the excavator 1, in the embodiment, the front side of the swing body 3. The imaging device 30b and the imaging device 30d may also be disposed in a manner oriented slightly to the work unit 2, more specifically, slightly oriented to the side of the imaging device 30a and the imaging device 30c.

According to the embodiment, the excavator 1 includes the four imaging devices 30, but the number of imaging devices 30 included in the excavator 1 may be at least two, and not limited to four. The reason is that the excavator 1 performs stereo photographing for an object by forming the stereo camera with at least a pair of the imaging devices 30.

The plurality of imaging devices 30a, 30b, 30c, 30d is disposed on the front and upper sides inside the operating room 4. The upper side is a side directed orthogonal to a ground contact surface of the crawlers 5a, 5b included in the excavator 1, and further directed away from the ground contact surface. The ground contact surface of the crawlers 5a, 5b is a flat surface in an area that at least one of the crawlers 5a, 5b contacts and is specified by at three points not located in a same line. The lower side is a side directed to an opposite side of the upper side, orthogonal to the ground contact surface of the crawlers 5a, 5b, and further directed away from the ground contact surface.

The plurality of imaging devices 30a, 30b, 30c, 30d performs stereo photographing for an object existing in front of the vehicle body 1B of the excavator 1. The object is, for example, a construction object constructed by at least one of the excavator 1, a work machine other than the excavator 1, and a worker who works in a construction site. The plurality of imaging devices 30a, 30b, 30c, 30d detects the object from a predetermined position of the excavator 1, in the embodiment, from the front and upper sides inside the operating room 4. According to the embodiment, the object is three-dimensionally measured by using a result of the stereo photographing performed by at least the pair of the imaging devices 30. Setting places of the plurality of imaging devices 30a, 30b, 30c, 30d are not limited to the front and upper sides inside the operating room 4.

Among the plurality of imaging devices 30a, 30b, 30c, 30d, for example, the imaging device 30c is set as a reference imaging device of these imaging devices. The plurality of imaging devices 30a, 30b, 30c, 30d respectively have coordinate systems. These coordinate systems will be suitably referred to as imaging device coordinate systems. In FIG. 2, only the coordinate system (Xs, Ys, Zs) of the reference imaging device 30c is illustrated. An origin of the imaging device coordinate system is a center point of the respective imaging devices 30a, 30b, 30c, 30d.

According to the embodiment, each of the imaging devices 30a, 30b, 30c, 30d has an imaging range larger than a range that can be constructed by the work unit 2 of the excavator 1. By thus setting, each of the imaging devices 30a, 30b, 30c, 30d can surely perform stereo photographing for the object in the range that can be constructed by the work unit 2.

The above-described vehicle body coordinate system (Xm, Ym, Zm) is, in the embodiment, a coordinate system in which an origin fixed at the swing body 3 that is a part of the vehicle body 1B is set as a basis. According to the embodiment, the origin of the vehicle body coordinate system (Xm, Ym, Zm) is, for example, a center of a swing circle of the swing body 3. The center of the swing circle is located on the swing center axis Zr of the swing body 3. A Zm-axis in the vehicle body coordinate system (Xm, Ym, Zm) is an axis to be the swing center axis Zr of the swing body 3. An Xm-axis is an axis extending in the front-rear direction of the swing body 3 and orthogonal to the Zm-axis. The Xm-axis is a reference axis in the front-rear direction of the swing body 3. The Ym-axis is an axis orthogonal to the Zm-axis and the Xm-axis and extending in the width direction of the swing body 3. The above-described global coordinate system (Xg, Yg, Zg) is a coordinate system measured by the GNSS and also is a coordinate system in which an origin fixed at the earth is set as a basis.

The vehicle body coordinate system is not limited to the example of the embodiment. The vehicle body coordinate system may have a center of the boom pin 13 as an origin of the vehicle body coordinate system, for example. The center of the boom pin 13 is a center of a cross-section obtained by cutting the boom pin 13 along a plane orthogonal to an extending direction of the boom pin 13, and also is a center in the extending direction of the boom pin 13.

<Position Measurement System>

Figure 3:
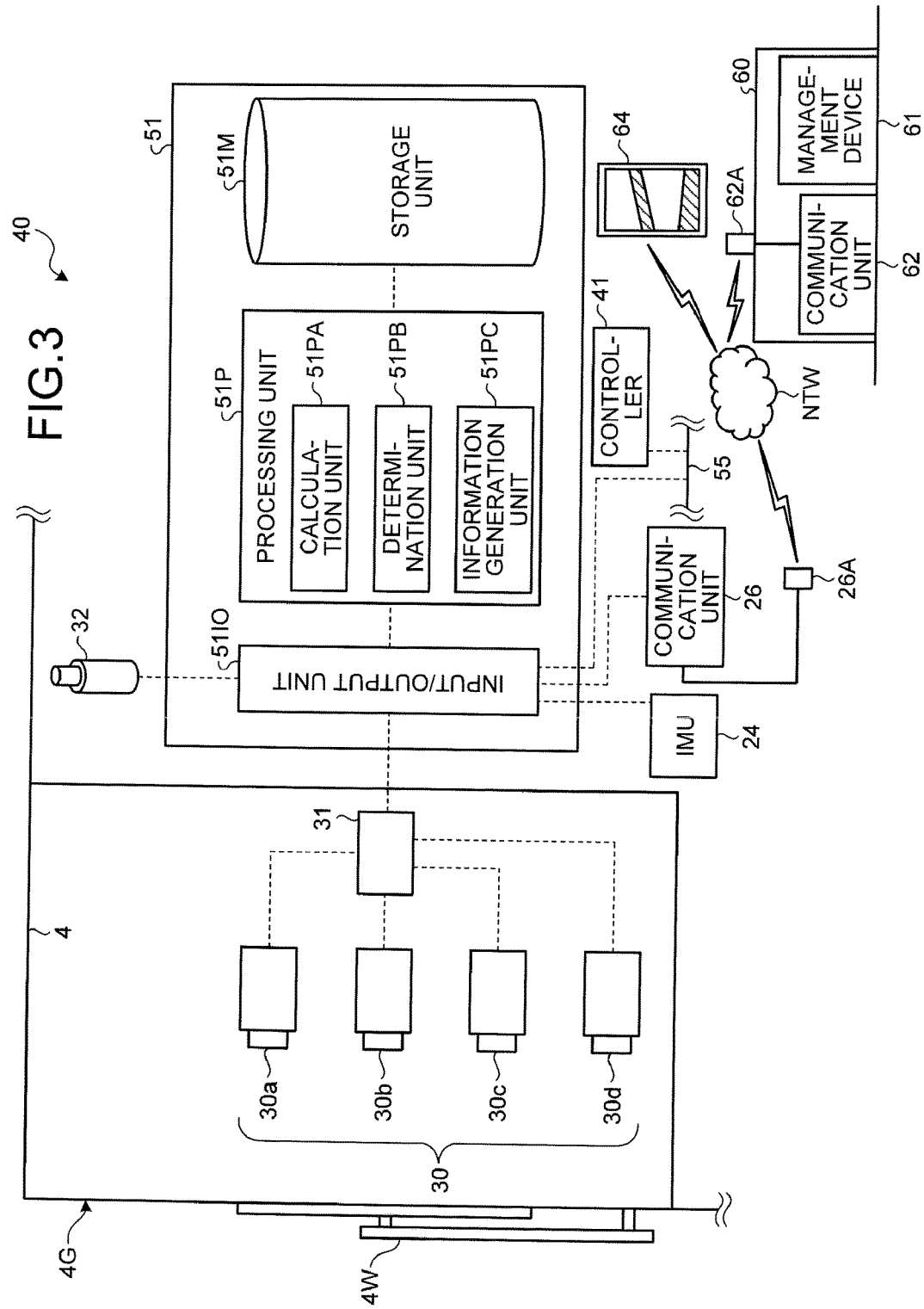
FIG. 3 is a diagram illustrating a position measurement system according to the embodiment.

FIG. 3 is a diagram illustrating a position measurement system 40 according to the embodiment. The position measurement system 40 includes the plurality of imaging devices 30a, 30b, 30c, 30d and a detection processor 51. These components are included in the vehicle body 1B of the excavator 1 illustrated in FIGS. 1 and 2. The plurality of imaging devices 30a, 30b, 30c, 30d is disposed inside the operating room 4 and captures images of an object outside the operating room 4 through a front glass 4G. According to the embodiment, the excavator 1 includes a wiper 4W in order to clean the front glass 4G.

According to the embodiment, the position measurement system 40 may further include a controller 41 and a management device 61 provided at a management facility 60. The management device 61 is a unit provided at the management facility 60 outside the excavator 1. The management device 61 controls construction condition of a construction site that the excavator 1 constructs, and further controls a state of the excavator 1. According to the embodiment, the management device 61 is a computer including a processor and a memory, but may also be formed of dedicated hardware. The detection processor 51 communicates with the management device 61 via a communication line NTW. The communication line NTW may perform either one of radio communication and wired communication. According to the embodiment, a description will be provided under the condition that the communication line NTW performs the radio communication.

The detection processor 51 includes a processing unit 51P, a storage unit 51M, and an input/output unit 51IO. The processing unit 51P is implemented by, for example, a processor such as a central processing unit (CPU) and a memory. The processing unit 51P includes a calculation unit 51PA, a determination unit 51PB, and an information generation unit 51PC. The detection processor 51 performs stereo measurement by using information of images of an object captured by at least a pair of imaging devices 30. By performing the stereo measurement, a position of the object, in the embodiment, a coordinate of the object in the three-dimensional coordinate system can be acquired from information of a pair of images of the object captured by at least the pair of imaging devices 30. Thus, the detection processor 51 is capable of performing three-dimensional measurement for the position of the object by using the pair of images obtained by capturing the images of the same object with at least the pair of imaging devices 30. Note that the processing unit 51P may also be provided at the management device 61. In this case, the pair of the images captured by at least the pair of imaging devices 30 is transmitted to the management facility 60 via a communication unit 26. Further, only the calculation unit 51PA and the determination unit 51PB or only the determination unit 51PB out of the processing unit 51P may be provided at the management device 61.

According to the stereo measurement, more specifically, measuring a position of the object by a stereo system, the position of the object, for example, a three-dimensional position is acquired from the two images obtained by observing the same object from the two different imaging devices 30. According to the stereo measurement, image processing in the stereo system is performed. According to the image processing in the stereo system, a search for a corresponding portion is made in the two images obtained by capturing images of the same object with the two different imaging devices 30, and disparity of the corresponding portion successfully found through the search is acquired. According to the stereo measurement, a distance to the object from a base line connecting the two imaging devices 30 is obtained by using the acquired disparity. The distance to the object is represented by, for example, a range image in which distance information to the object is visualized by shading. In the following description, the range image may be referred to as a disparity image.

The position measurement system 40 implements the position measurement method according to the embodiment. In the position measurement method according to the embodiment, at least a pair of imaging devices 30 mounted on the excavator 1 captures images of an object, the detection processor 51 performs stereo measurement by using information of the images of the object captured by at least the pair of imaging devices 30, and condition related to imaging capturing by the imaging device 30 (hereinafter suitably referred to as imaging condition) is determined based on a performance result of stereo measurement. The processing unit 51P of the detection processor 51 reads and executes a computer program stored in the storage unit 51M. The computer program is adapted for the processing unit 51P to perform the position measurement method according to the embodiment.

The imaging condition influences the stereo measurement performed by at least the pair of imaging devices 30. According to the embodiment, the imaging condition includes a state between the imaging device 30 and the object captured by the imaging device 30, and a posture of the imaging device 30. The state between the imaging device 30 and the object captured by the imaging device 30 is changed by, for example, weather condition around the imaging device 30 and a peripheral environment of the imaging devices 30. According to the embodiment, the plurality of imaging devices 30 is disposed inside the operating room 4 as illustrated in FIG. 2. Therefore, the front glass 4G of the operating room 4 is interposed between the imaging device 30 and the object captured by the imaging device 30. When a water droplet or snow adhere to the front glass 4G by rain or snow, or when dust adheres to the front glass 4G, a search for a corresponding portion between a pair of images cannot be performed in the image processing by the stereo system, and there may be a case where the stereo measurement cannot be performed in a portion where the search cannot be performed. Further, even when neither the water droplet nor snow adheres to the front glass 4G, in the case where the imaging device 30 captures the image of the object in a state of rainfall or snowfall, the search for the corresponding portion between the pair of images cannot be performed in the image processing by the stereo system, and there also may be a case where the stereo measurement cannot be performed in a portion where the search cannot be performed.

The posture of the imaging device 30 may be changed by, for example, change with the passage of time. When the posture of the imaging device 30 is changed, a relative positional relation between the pair of imaging devices 30, 30 constituting the stereo camera is changed. More specifically, positional displacement is caused between the pair of imaging devices 30, 30 constituting the stereo camera. Then, the search for the corresponding portion between the pair of images cannot be performed in the image processing by the stereo system, and there may be a case where the stereo measurement cannot be performed in a portion where the search cannot be performed.

In the case of performing the stereo measurement, the imaging condition can be determined by utilizing a fact that the search for the corresponding portion between the pair of images captured by the pair of imaging devices 30 cannot be performed, more specifically, utilizing a fact that the stereo measurement cannot be performed. The position measurement system 40 and the position measurement method according to the embodiment determines the imaging condition of the imaging device 30 based on a performance result of the stereo measurement using at least the pair of the imaging devices 30.

For example, the detection processor 51 obtains an image such as a range image or a disparity image by applying the image processing by the stereo system to the images of the object captured by at least the pair of imaging devices 30. The detection processor 51 obtains a portion included in the obtained image where the corresponding portion is successfully found through the search, more specifically, the potion where the stereo measurement is successfully performed, and a portion corresponding to a pattern included in the obtained image. The detection processor 51 acquires a ratio of the potion where the stereo measurement is successfully performed in the portion corresponding to the pattern included in the obtained image. The imaging condition is determined by using this ratio. According to the embodiment, the calculation unit 51PA of the processing unit 51P in the detection processor 51 performs stereo measurement, and the determination unit 51PB determines the imaging condition. According to the embodiment, troubles in the imaging device 30 itself, such as failure and malfunction of the imaging device 30, are treated as errors of the imaging device 30. The imaging condition according to the embodiment is determined by using the detection processor 51. Therefore, the state of the imaging device 30 itself is determined by another device such as the controller 41.

As the storage unit 51M, at least one of a non-volatile and volatile semiconductor memory such as a random access memory (RAM), a random access memory (ROM), a flash memory, an erasable programmable random access memory (EPROM), and an electrically erasable programmable random access magnetic memory (EEPROM), a magnetic disk, a flexible disk, and a magnetic optical disk is used. The storage unit 51M stores the computer program in order to cause the processing unit 51P to perform the position measurement method according to the embodiment. The storage unit 51M stores information used when the processing unit 51P performs the position measurement method according to the embodiment. The information includes, for example, internal calibration data for the respective imaging devices 30, postures of the respective imaging devices 30, positional relation between the imaging devices 30, and so on.

The input/output unit 51IO is an interface circuit in order to connect the detection processor 51 to other devices. According to the embodiment, a hub 31, an imaging switch 32, an IMU 24, the communication unit 26, and a signal line 55 are connected to the input/output unit 51IO. A device and a signal line connected to the input/output unit 51IO are not limited to those of the embodiment. The plurality of imaging devices 30a, 30b, 30c, 30d is connected to the hub 31. Results captured by the imaging devices 30a, 30b, 30c, 30d are received in the input/output unit 51IO via the hub 31. The processing unit 51P acquires, via the hub 31 and the input/output unit 51IO, image information corresponding to the results captured by the imaging devices 30a, 30b, 30c, 30d. The imaging devices 30a, 30b, 30c, 30d may be directly connected to the input/output unit 51IO without the hub 31.

According to the embodiment, the imaging switch 32 is disposed inside the operating room 4 illustrated in FIG. 2.

For example, the imaging switch 32 is set near the operation unit 35, but a setting place of the imaging switch 32 is not limited thereto. When the imaging switch 32 is operated, at least the pair of the imaging devices 30 captures images of an object. When the images of the object are captured, the calculation unit 51PA of the processing unit 51P acquires the image information corresponding to the results captured by the imaging devices 30a, 30b, 30c, 30d, and performs the stereo measurement by using the acquired image information. The determination unit 51PB determines the imaging condition based on the performance result of stereo measurement of the calculation unit 51PA. The information generation unit 51PC outputs at least one of the performance result of the stereo measurement and the imaging condition to the signal line 55 or to the outside of the excavator 1 via the communication unit 26 and an antenna 26A. The signal line 55 is connected to other devices included in the excavator 1, for example, the controller 41 that controls the excavator 1. According to the embodiment, a communication standard using the signal line 55 is a controller area network (CAN).

The IMU 24 detects and outputs an acceleration rate and an angular velocity acting on its own, more specifically, an acceleration rate and an angular velocity acting on the excavator 1. The posture of the excavator 1 is detected based on the acceleration rate and the angular velocity acting on the excavator 1. A device other than the IMU 24 may also be applied as far as the device is capable of detecting the posture of the excavator 1. The detection processor 51 acquires detected values of the IMU 24, and then converts a three-dimensional position obtained by performing the stereo measurement for the object to, for example, a position in the global coordinate system.

The detection processor 51 may be implemented by dedicated hardware or may also be implemented by a plurality of processing circuits that works together to achieve functions of the detection processor 51 such as the functions of the processing unit 51P, storage unit 51M, and input/output unit IO.

<Stereo Measurement>

Figure 4:
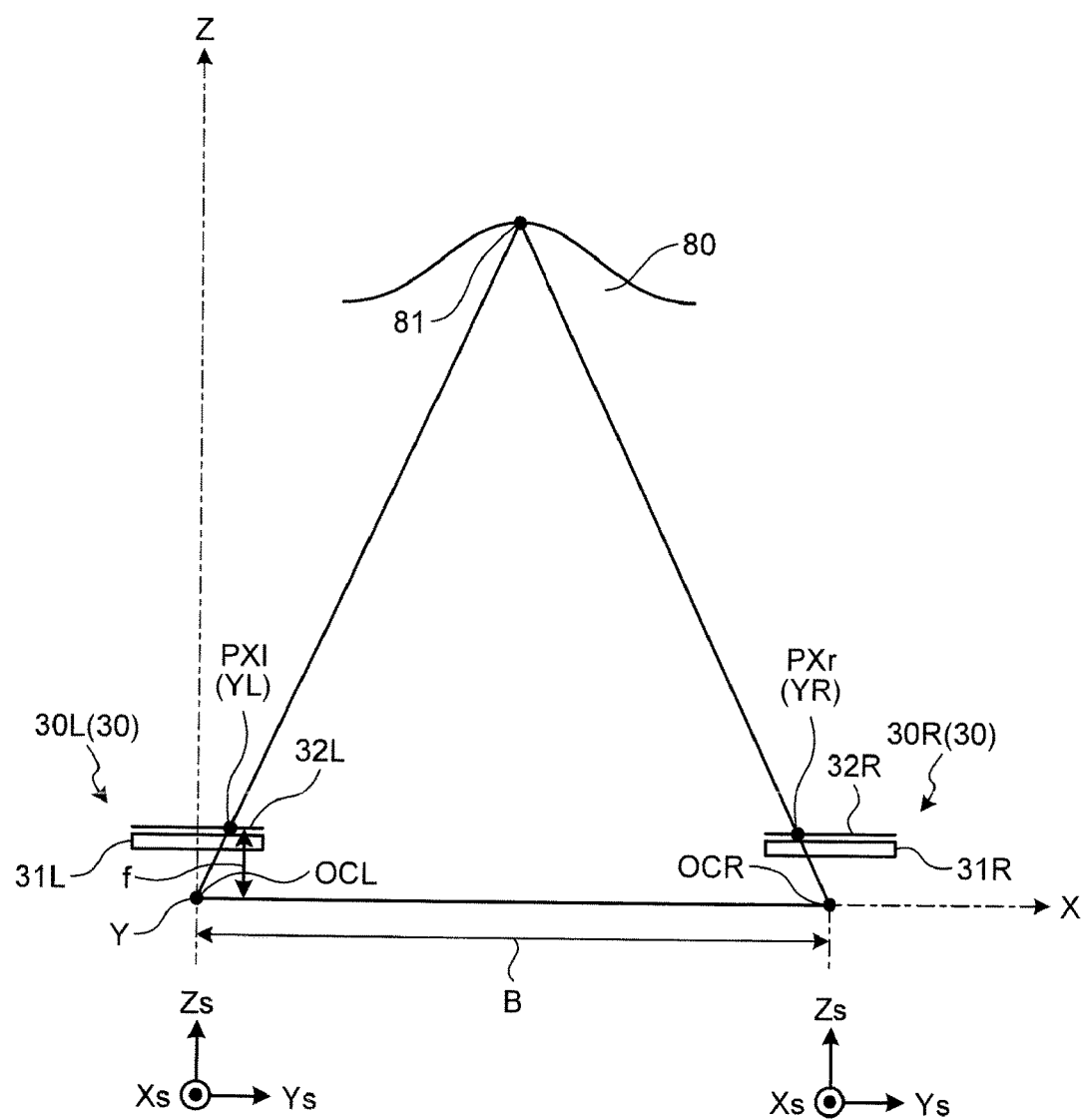
FIG. 4 is an explanatory diagram for an example in which an object is three-dimensionally measured by using a pair of imaging devices.
Figure 5:
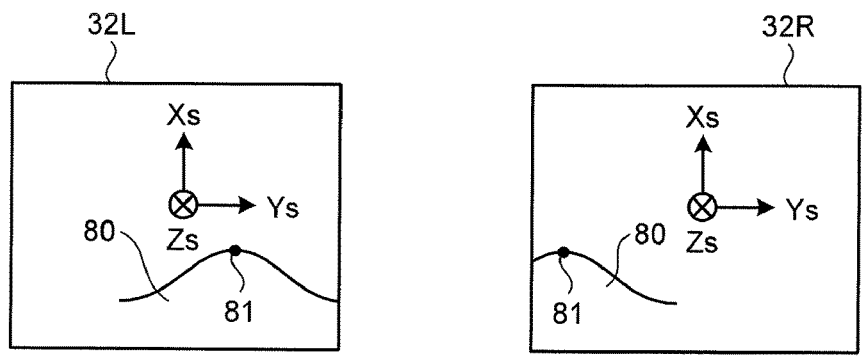
FIG. 5 is a diagram illustrating a pair of images captured by the pair of imaging devices.
Figure 6:
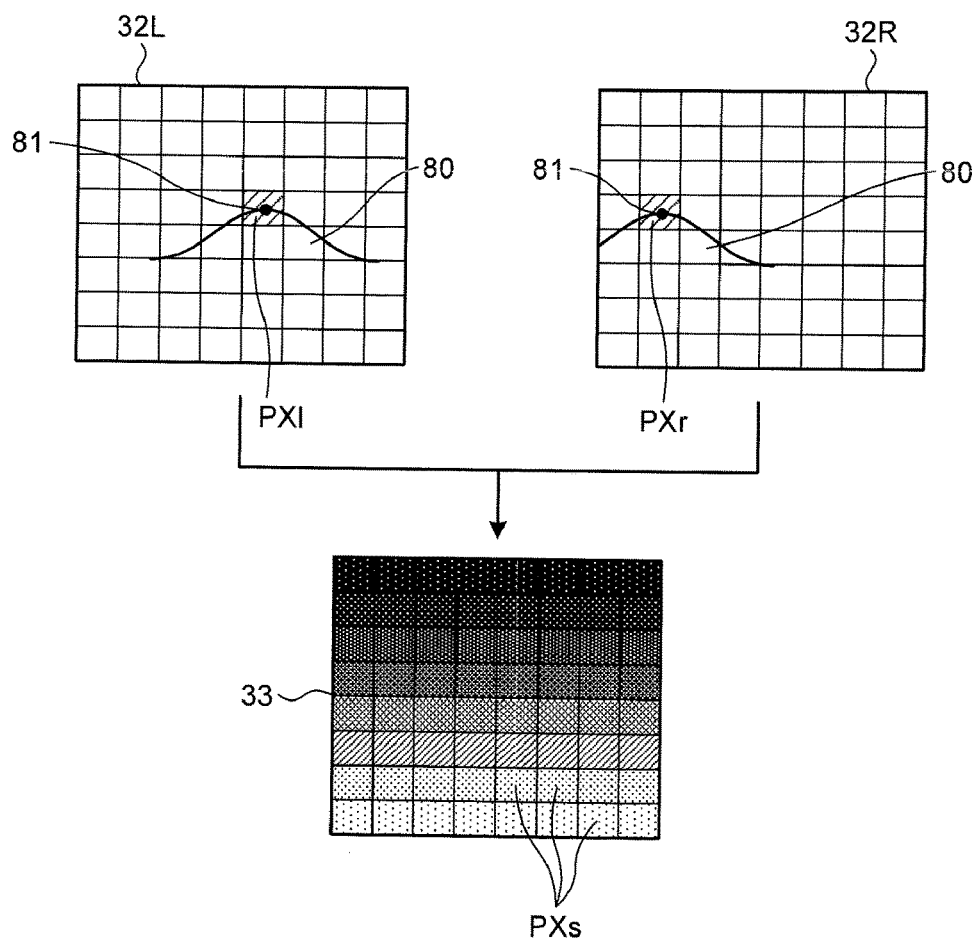
FIG. 6 is a diagram illustrating a pair of images captured by the pair of imaging devices.

FIG. 4 is an explanatory diagram for an example in which an object 80 is three-dimensionally measured by using a pair of imaging devices 30L, 30R. FIGS. 5 and 6 are diagrams illustrating a pair of images 32L, 32R captured by the pair of imaging devices 30L, 30R. According to the embodiment, the detection processor 51 illustrated in FIG. 3 obtains a position of the object 80 by applying the image processing by the stereo system to the pair of images captured by the pair of imaging devices 30. In FIG. 4, the pair of imaging devices 30 that captures the object 80 will be referred to as the imaging device 30L and the imaging device 30R. The pair of imaging devices 30L, 30R are the imaging devices 30 included in the excavator 1 illustrated in FIG. 2.

The imaging device 30L includes an imaging element 31L. An origin of the imaging device global coordinate system (Xs, Ys, Zs) of the imaging device 30L, more specifically, a center of the imaging device 30L is set as an optical center OCL. A Zs-axis of the imaging device 30L is an optical axis of the imaging device 30L and passes through the optical center OCL. The imaging device 30L captures an image of an object, thereby obtaining the image 32L including the object. The imaging device 30R includes an imaging element 31R. The origin of the imaging device global coordinate system (Xs, Ys, Zs) of the imaging device 30R, more specifically, a center of the imaging device 30R is set as an optical center OCR. A Zs-axis of the imaging device 30R is an optical axis of the imaging device 30R and passes through the optical center OCR. The imaging device 30R captures an image of the object, thereby obtaining the image 32R including the object.

According to the embodiment, the object 80 of the stereo measurement is, for example, a construction object of the excavator 1. The imaging device 30L and the imaging device 30R capture the images of the object 80, thereby obtaining the pair of images 32L and 32R as illustrated in FIG. 5. The imaging device 30L is disposed on a left side when a person faces the bucket 8, and the imaging device 30R is disposed on a right side when a person faces the bucket 8, and further the imaging device 30R is separated from the imaging device 30L by a predetermined distance B. As illustrated in FIG. 5, the position of the object 80 inside the image 32L captured by the imaging device 30L differs from the position of the object 80 inside the image 32R captured by the imaging device 30R in an alignment direction of the imaging device 30L and the imaging device 30R. Thus, since the imaging device 30L and the imaging device 30R are separately disposed by the predetermined distance, the directions in which the object can be seen are different because of a positional difference between observation points relative to the object.

The detection processor 51 performs the image processing by the stereo system for the image 32L of the object 80 captured by the imaging device 30L and the image 32R of the object 80 captured by the imaging device 30R. The position of the same object that is the object 80 is three-dimensionally measured by the image processing by the stereo system. The image processing by the stereo system includes a step of generating a disparity image 33 from the pair of images 32L, 32R, and a step of three-dimensionally measuring a space of an imaging range of the imaging devices 30L, 30R based on disparity information included in the disparity image 33.

In the step of generating the disparity image 33, as illustrated in FIG. 6, the detection processor 51 makes a search for a corresponding portion between the pair of images 32L, 32R, for example, a search for pixels PXl, PXr corresponding to a portion 81 of the object 80 illustrated in FIG. 4, and obtains disparity from a search result for the corresponding pixels PXl, PXr. The disparity is the information indicating how far the pixels PXl, PXr that correspond to the portion 81 of the object 80 are separated from each other, more specifically, by how many pixels the pixels PXl, PXr are separated from each other. The disparity image 33 is an image in which the disparity is represented by a two-dimensional array. According to the stereo measurement, a distance to the object is obtained by using the disparity. An image in which the distance to the object is represented by the two-dimensional array instead of disparity is the range image.

Meanwhile, disparity is generally defined as a change amount of an angle formed by visual lines of the pair of imaging devices 30 at a base point to be a measurement object. In the case where the pair of imaging devices 30 is aligned in parallel, disparity indicates by how many pixels inside the captured image a projected point of a measuring point in an image of one imaging device to be the reference imaging device is displaced from a projection point of the same measuring point in an image of the other imaging device 30.

In the disparity image 33, in the case where the search for the corresponding pixel is not successfully performed, 0 is stored in a pixel PXs where the search is not successfully performed, and in the case where the search is successfully performed, a value larger than 0 is stored in the pixel PXs where the search is successfully performed. In the disparity image 33, the pixel PXs storing 0 is colored in black, and the pixel PXs storing the value larger than 0 is colored in a gray scale. The pixel PXs storing the value other than 0 indicates a place where the stereo measurement is successfully performed inside the disparity image 33 or the range image.

Whether the stereo measurement is successfully performed in an entire portion of the captured object can be determined by a percentage of the pixel PXs storing the value other than 0 inside the disparity image 33. For example, in the case where the percentage of the pixels PXs of the gray scale, more specifically, the pixel PXs storing the value other than 0 inside the disparity image 33 is a threshold value or more, it is determined that the stereo measurement is successfully performed in the entire portion of the captured object. The threshold value can be set to, for example, from 80% to 95%, but not limited thereto.

In the step of performing the stereo measurement, the detection processor 51 obtains the distance up to the object 80, in this example, up to the portion 81 of the object 80 by using triangulation. As illustrated in FIG. 4, the three-dimensional coordinate system (X, Y, Z) in which the optical center OCL of the imaging device 30L is defined as the origin is set. Assume that the imaging device 30L and the imaging device 30R are disposed in parallel. More specifically, assume that the image surfaces of the images 32L, 32R are the same surfaces and further positions in an X-axis direction is the same between the imaging device 30L and the imaging device 30R. Assume that a distance between the optical center OCL of the imaging device 30L and the optical center OCR of the imaging device 30R is defined as B, the portion 81 of the object 80 inside the image 32L captured by the imaging device 30L, namely, a Y-coordinate of the pixel PXl is defined as YL, the portion 81 of the object 80 inside the image 32R captured by the imaging device 30R, namely, a Y-coordinate of the PXr is defined as YR, and a Z-coordinate of the portion 81 of the object 80 is set as ZP. All of YL, YR, ZP are coordinates in the three-dimensional coordinate system (X, Y, Z). The distance between the Y-axis and the image surfaces of the images 32L, 32R corresponds to a focal length f of the imaging devices 30L, 30R.

In this case, the distance to the portion 81 of the object 80 from the imaging devices 30L, 30R corresponds to ZP that is a Z-coordinate of the blade tip 8T in the three-dimensional coordinate system (X, Y, Z). Assuming that the disparity is d=YL-(YR-B), ZP can be obtained by B×f/d.

Each of the pixels PXs in the disparity image 33 illustrated in FIG. 6 stores information indicating whether the search is successfully performed or not, and stores the disparity d in the case where the search is successfully performed. The detection processor 51 can obtain the distance to the object based on the disparity d between the respective pixels where the search is successfully performed inside the images 32L, 32R, the coordinates of the respective pixels where the search is successfully performed inside the images 32L, 32R, and the focal length f of the imaging devices 30L, 30R.

In the example illustrated in FIG. 6, the detection processor 51 makes a search for the corresponding pixel between the pair of the images 32L, 32R, and generates the disparity image 33. Next, the detection processor 51 makes a search for the pixels PXl, PXr corresponding to the portion 81 of the object 80 up to which the distance is obtained. In the case where the search for the pixels PXl, PXr corresponding to the portion 81 of the object 80 is successfully performed between the pair of images 32L, 32R, the detection processor 51 obtains YL, YR that are Y-coordinates of the pixels PXl, PXr for which the search is made. The detection processor 51 plugs the acquired values of YL, YR and the distance B into the formula of the disparity d, namely, d=YL-(YR-B), and obtains the disparity d. The detection processor 51 obtains the distance ZP from the imaging devices 30L, 30R to the blade tip 8T by using and plugging the obtained disparity d, distance B, and focal distance f into the above formula.

Since the imaging devices 30L, 30R are disposed inside the operating room 4 illustrated in FIG. 2, the front glass 4G is interposed between the imaging devices 30L, 30R and the blade tip 8T of the bucket 8. In the case where a water droplet, dust, etc. adhere to the front glass 4G, there may be a case where the object 80 is not photographed in at least one of the pair of images 32L, 32R. In this case, search for the corresponding pixel is not successfully performed. Therefore, in the disparity image 33, the percentage of the pixel PXs of the gray scale is reduced in the entire portion, and the percentage of the black pixels is increased.

Thus, the percentage of the portion where the stereo measurement is successfully performed inside the disparity image or the range image is varied in accordance with the state between the imaging device 30 and the object 80 captured by the imaging device 30, and at least one of the postures of the pair of imaging devices 30 constituting the stereo camera. Therefore, the detection processor 51 can determine the imaging condition by using a performance result of the stereo measurement such as the percentage of the portion where the stereo measurement is successfully performed inside the disparity image or the range image.

<Influence of Rain>

A stereo percentage STR can be obtained by a following formula (1). In the formula (1), PXS represents a total number of pixels where the stereo measurement is successfully performed inside a processed image obtained as a result of the image processing by the stereo system in the stereo measurement. The case where the stereo measurement is successfully performed corresponds to a case where search for a corresponding pixel can be performed between a pair of images is detected. In the formula (1), PXA represents a total number of pixels in a range where a pattern is located inside the image (at least one of the two images) captured by the pair of the imaging devices 30, 30. According to the embodiment, in the case of obtaining the stereo percentage STR, the calculation unit 51PA of the detection processor 51 performs the stereo measurement in the range where the pattern is located inside the image. Determining the stereo percentage STR by the determination unit 51PB is performed in the range where the pattern is located inside the image.

$$STR=PXS/PXA \qquad (1)$$

An example of obtaining the range where the pattern is located inside the image will be described. According to the embodiment, the calculation unit 51PA of the detection processor 51 detects a pattern by targeting one of images captured by the pair of the imaging devices 30, 30 (hereinafter conveniently referred to as a reference image). In the case of detecting the pattern, the calculation unit 51PA targets a certain pixel inside the reference image, for example. The targeted pixel will be referred to as target pixel hereinafter. The calculation unit 51PA compares luminance of the target pixel with luminance of pixels in a periphery of the target pixel, and obtains a luminance difference between the target pixel and the peripheral pixels. In the case where the pixels are arranged in a checkerboard pattern, the number of peripheral pixels of the target pixel is eight. In the case where variation of the luminance difference is a threshold value or more, the calculation unit 51PA determines that the target pixel is a pattern, and in the case where variation of the luminance difference is smaller than the threshold value, the calculation unit 51PA determines that the target pixel is not a pattern. The pattern may be detected either after or before obtaining the disparity image as far as the pattern is detected before obtaining the stereo percentage STR. In order to determine whether a result of capturing the place where the pattern is located is appropriate, it is more preferable to use the stereo percentage STR of the range where the pattern is located.

According to the embodiment, instead of detecting the pattern, the calculation unit 51PB may obtain the stereo percentage STR by, for example, using the percentage of the pixel where the stereo measurement is successfully performed inside the image obtained as a result of performing the image processing by the stereo system in the stereo measurement.

Figure 7:
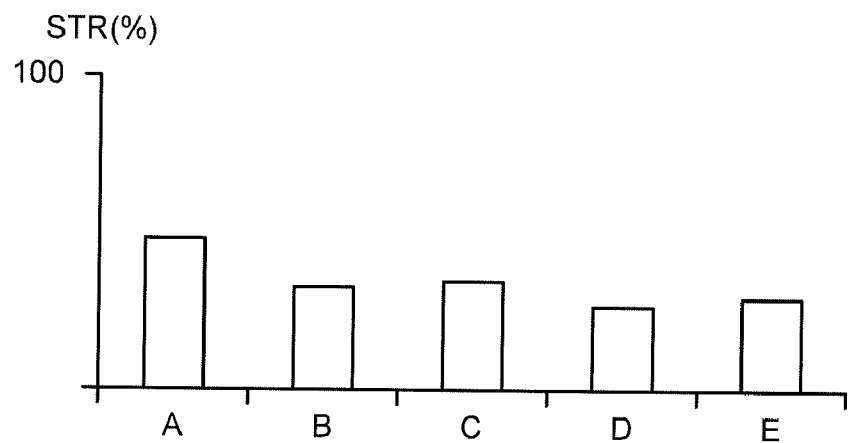
FIG. 7 is a diagram illustrating a relation between a stereo percentage and a peripheral state of the imaging device.
Figure 8:
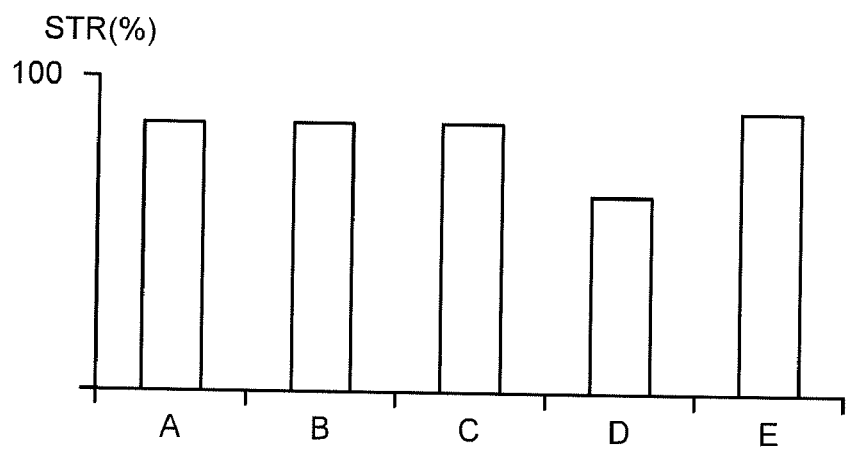
FIG. 8 is a diagram illustrating the relation between the stereo percentage and the peripheral state of the imaging device.

FIGS. 7 and 8 are diagrams illustrating a relation between the stereo percentage STR and a peripheral state of the imaging device 30. Both of FIGS. 7 and 8 illustrate exemplary test results. FIG. 7 is the result of the stereo measurement using the pair of the imaging devices 30*a*, 30*b* illustrated in FIG. 2, and FIG. 8 is the result of the stereo measurement using the pair of imaging devices 30*c*, 30*d* illustrated in FIG. 2. The pair of imaging devices 30*a*, 30*b* is disposed having optical axes thereof oriented upward, and the pair of imaging devices 30*c*, 30*d* are disposed having optical axes thereof oriented downward. In FIGS. 7 and 8, a vertical axis represents the stereo percentage STR having the unit %. A point where the vertical axis intersects with a horizontal axis in FIGS. 7 and 8 is not 0%.

In FIGS. 7 and 8, a state A is a state of having no rain, a state B is a state of having light rain and not operating the wiper 4W, a state C is a state of having light rain and operating the wiper 4W, a state D is a state of having heavy rain and not operating the wiper 4W, and a state E is a state of having heavy rain and operating the wiper 4W. In other words, the state A corresponds to a state in which the front glass 4G is dry. On the other hand, the states B and C, namely, the cases of having light rain correspond to a state in which a small amount of water droplets adheres to the front glass 4G of the operating room 4 illustrated in FIG. 2. Further, the states D and E, namely, the cases of having heavy rain correspond to a state in which a larger amount of water droplets than the case of having light rain adheres to the front glass 4G of the operating room 4.

According to the results of the pair of imaging devices 30*a*, 30*b* having the optical axes oriented upward (FIG. 7), it is found that: in the case of raining, the stereo percentage STR is more reduced compared to the case of having no rain; in the case of having heavy rain, the stereo percentage STR is more reduced compared to the case of having light rain; and when the wiper 4W is operated in the case of raining, the stereo percentage STR is more improved. According to the results of the pair of imaging devices 30*c*, 30*d* having the optical axes oriented downward (FIG. 8), it is found that: in the case of having light rain, the stereo percentage STR is influenced little; in the case of heavy rain, the stereo percentage STR is rapidly reduced; and when the wiper 4W is operated particularly in the case of raining, the stereo percentage STR is improved.

Thus, the imaging condition of the imaging device 30 can be determined based on the performance result of stereo measurement, in the embodiment, the stereo percentage STR. The stereo percentage STR of the pair of imaging devices 30*a*, 30*b* having the optical axes oriented upward tends to be more easily influenced by rain and the wiper 4W than that the stereo percentage by the pair of imaging devices 30*c*, 30*d* having the optical axes oriented downward does. More specifically, the pair of imaging devices 30*a*, 30*b* having the optical axes oriented upward has higher sensitivity to detect influence of peripheral state than the pair of imaging devices 30*c*, 30*d* having the optical axes oriented downward does. Therefore, in the case where the detection processor 51 determines the imaging condition of the imaging devices 30, it is preferable to use the information of the images captured by the pair of imaging devices 30*a*, 30*b* having the optical axes oriented upward. Further, FIGS. 7 and 8 illustrate the test results in the case where water droplets adhere to the front glass 4G by raining, but the stereo percentage STR at the time when the imaging devices 30 captures the image of the object in the imaging condition of raining or snowing although no droplet adheres to the front glass 4G is more reduced than the stereo percentage STR at the time when the imaging device captures the image of the object in fine weather.

FIG. 9 is a flowchart illustrating an exemplary process of the position measurement method according to the embodiment. This exemplary process is an example of determining a state between the imaging device 30 and the object captured by the imaging device 30, such as an example of determining a peripheral environment of the imaging device 30. In Step S11, at least the pair of imaging devices 30 illustrated in FIGS. 2 and 3 captures images of the object. As described above, in the case of determining the imaging condition, it is preferable to use the pair of imaging devices 30*a*, 30*b* having the optical axes oriented upward. In Step S12, the calculation unit 51PA of the detection processor 51 illustrated in FIG. 3 acquires imaging results of at least the pair of imaging devices 30, more specifically, information of at least one pair of images, and applies the image processing by the stereo system to the image information. In Step S13, the calculation unit 51PA obtains the stereo percentage STR from the image obtained as a result of the image processing by the stereo system. In Step S14, the determination unit 51PB determines the imaging condition of the imaging devices 30 by using the stereo percentage STR.

The determination unit 51PB may output a determination result to at least one of the storage unit 51M and the outside. In the case where the determination result is output to the outside, the determination unit 51PB can output the determination result to, for example, the management device 61 provided outside the excavator 1 or a portable terminal device 64 having a communication function. An administrator using the management device 61 takes a necessary measure for the excavator 1 based on the determination result output from the determination unit 51PB. Further, in the case where the portable terminal device 64 having acquired the determination result is used by an operator of the excavator 1 or the administrator of the excavator 1, the operator or the administrator takes the necessary measure for the excavator 1 based on the determination result output from the determination unit 51PB. The necessary measure based on the determination result will be described later.

In the case of determining the imaging condition of the imaging devices 30, for example, a table correlating stereo percentages STR to imaging conditions is created, and preliminarily stored in the storage unit 51M of the detection processor 51. The determination unit 51PB acquires a stereo percentage STR from the calculation unit 51PA, refers to the table of the storage unit 51M, and reads the imaging condition corresponding to the acquired stereo percentage STR from the table. The read imaging condition is adopted as the imaging condition of the at least one pair of imaging devices 30. For example, the imaging condition is determined as next: in the case where the stereo percentage STR is a first threshold value or less, the imaging condition is determined as light rain; and in the case where the stereo percentage is equal to or less than a second threshold value smaller than the first threshold value, the image capturing condition is determined as heavy rain.

In this exemplary process, the case where the imaging condition is rainy, more specifically, the case where water droplets exist between the imaging device 30 and the object captured by the imaging device 30 is exemplified. However, the image capturing condition may be a case where dust exists or a case where snow or sleet exists between the imaging device 30 and the object captured by the imaging device 30. Further, the imaging condition is not limited to the state between the imaging device 30 and the object captured by the imaging device 30, but may be a posture of the imaging devices 30. For example, the imaging condition is determined as follows: in the case where the stereo percentage STR is larger than the first threshold value, positional displacement between the pair of imaging devices 30, 30 is determined as a tolerable range; in the case where the stereo percentage STR is the first threshold value or less, positional displacement between the pair of imaging devices 30, 30 is determined as a non-tolerable range but can be corrected by re-calibration; and in the case where the stereo percentage STR is equal to or smaller than the second threshold value smaller than the first threshold value, it is determined that correction of the setting state of the imaging device 30 is necessary. As described above, in the case where the posture of the imaging device 30 is changed due to, for example, change with the passage of time, it is determined that the imaging condition (setting state of imaging device) is not appropriate based on the stereo percentage STR acquired from the images of the object captured by the imaging devices 30.

The determination unit 51PB of the detection processor 51 may determine the imaging condition based on time-series variation of the stereo percentage STR. For example, in the case where the stereo percentage STR is reduced temporarily as a result of acquiring the stereo percentages STR at different timing, the determination unit 51PB determines that the reason for the reduced stereo percentage STR is the peripheral environment of the imaging device 30, such as rain or snow. In the case where the stereo percentage STR is continuously reduced as a result of acquiring the stereo percentages STR at different timing, the determination unit 51PB determines that this is caused by positional displacement of the imaging device 30, dirt on the front glass 4G, dirt on a lens of the imaging device 30, or the like.

In the case where the stereo percentage STR is continuously reduced, the detection processor 51 changes a parameter that determines the posture of the imaging device 30 and re-calculates the stereo percentage STR relative to the same imaging result. In the case where the stereo percentage STR does not change even though the parameter is changed, the determination unit 51PB of the detection processor 51 determines that the front glass 4G of the operating room 4 or the lens of the imaging device 30 is dirty. In the case where the stereo percentage STR is increased when the parameter is changed, the determination unit 51PB of the detection processor 51 determines that positional displacement occurs between the pair of imaging devices 30, 30, and outputs a notification indicating that correction of the setting state of the imaging device 30 is necessary. In the case where the stereo percentage STR is returned to a level same as the level before the stereo percentage STR is reduced when the parameter is changed, the determination unit 51PB of the detection processor 51 determines that positional displacement between the pair of the imaging devices 30, 30 can be corrected, and determines, as a new parameter, a parameter at the time of having the highest the stereo percentage STR.

The parameter that determines the posture of the imaging device 30 may include rotational direction correction amounts $\alpha$, $\beta$, $\gamma$ and translational direction correction amounts $\Delta X$, $\Delta Y$, $\Delta Z$. In the pair of imaging devices 30, 30 constituting the stereo camera, the rotational direction correction amounts $\alpha$, $\beta$, $\gamma$ are amounts to correct displaced amounts in the rotational directions around an Xs-axis, a Ys-axis, and a Zs-axis in the imaging device coordinate system illustrated in FIG. 2. In the pair of imaging devices 30, 30 constituting the stereo camera, the translational direction correction amount $\Delta X$, $\Delta Y$, $\Delta Z$ are amounts to correct displaced amounts in directions parallel to the Xs-axis, Ys-axis, and Zs-axis in the imaging device coordinate system. The detection processor 51 recalculates the stereo percentage STR by changing the rotational direction correction amounts $\alpha$, $\beta$, $\gamma$ and the translational direction correction amounts $\Delta X$, $\Delta Y$, $\Delta Z$ for one of the pair of imaging devices 30, 30.

When the determination unit 51PB determines the imaging condition of the imaging device 30, the controller 41 of the excavator 1 may determine a control matter for the excavator 1, more specifically, a handling matter based on the determination result. Here, the determination unit 51PB may also determine the handling matter. The handling matter includes at least one of the control matter for the excavator 1 and a notification to a person who operates the excavator 1. The notification is information related to operation of the excavator 1. A person who operates the excavator 1 includes at least one of the operator of the excavator 1, the administrator of the excavator 1, and a service man. According to the embodiment, the controller 41 corresponds to a control unit that determines the control matter for the excavator 1 based on the determination result. For example, in the case where the imaging condition is rainy, the controller 41 determines, as the control matter for the excavator 1, to provide control to operate the wiper 4W to clean the front glass 4G of the operating room 4. The controller 41 operates the wiper 4W based on the determined control matter. The controller 41 may display a command to operate the wiper 4W on a monitor screen provided inside the operating room 4 of the excavator 1. The operator of the excavator 1 visually confirms the command displayed on the monitor screen, and operates the wiper 4W.

For example, in the case where the imaging condition is rainy, the controller 41 determines, as the control matter for the excavator 1, to provide control not to perform the stereo measurement. The controller 41 does not perform the stereo measurement based on the determined control matter. For example, even in the case where an imaging command is received in the detection processor 51 by operation of the imaging switch 32, the detection processor 51 does not allow the imaging device 30 to perform image capturing. At this point, the controller 41 may display the command not to perform the stereo measurement on the monitor screen provided inside the operating room 4 of the excavator 1.

For example, in the case of determining that there is positional displacement of the imaging device 30, the controller 41 determines, as the control matter for the excavator 1, to provide control to display occurrence of the positional displacement of the imaging device 30 on the monitor provided inside the operating room 4 of the excavator 1. The controller 41 allows the above-described monitor to display occurrence of the positional displacement of the imaging device 30 based on the determined control matter. The operator of the excavator 1 having visually confirmed the display on the monitor performs, for example, calibration for the imaging device 30, or requests a service man to adjust the setting position of the imaging device 30.

In the exemplary process according to the embodiment, the detection processor 51 determines the imaging condition of the imaging device 30 based on the performance result of stereo measurement, but the method is not limited thereto. For example, the detection processor 51 may output the performance result of stereo measurement, in the embodiment, the stereo percentage STR to the management device 61 that is the external device of the excavator 1, and the management device 61 may determine the imaging condition of the imaging device 30. In this case, the determination unit 51PB of the processing unit 51P included in the detection processor 51 is included in the management device 61.

The management device 61 having acquired the performance result of stereo measurement from the detection processor 51 determines the imaging condition based on the performance result. This determination is made by the determination unit 51PB included in the management device 61. The management device 61 determines the control matter for the excavator 1 based on the imaging condition that is the determination result, and may output the determined control matter to the excavator 1 via a communication unit 62 and an antenna 62A. For example, in the case where the imaging condition is rainy, the management device 61 determines, as the control matter for the excavator 1, to provide control to operate the wiper 4W and then outputs this control matter to the excavator 1 via the communication unit 62 connected to the management device 61. The excavator 1 or the operator of the excavator 1 operates the wiper 4W based on the control matter acquired from the management device 61 via the communication unit 26.

For example, in the case where the imaging condition is rainy, the management device 61 determines, as the control matter for the excavator 1, to provide control not to perform the stereo measurement, and outputs the control matter to the excavator 1 via the communication unit 62 and the antenna 62A. The excavator 1 does not perform the stereo measurement based on the control matter acquired from the management device 61. For example, even in the case where an imaging command is received in the detection processor 51 by operation of the imaging switch 32, the detection processor 51 does not allow the imaging device 30 to perform image capturing. At this point, the command not to perform the stereo measurement may also be displayed on the monitor screen provided inside the operating room 4 of the excavator 1.

For example, in the case of determining that there is positional displacement of the imaging device 30, the management device 61 determines, as the control matter for the excavator 1, to provide control to display occurrence of the positional displacement of the imaging device 30 on the monitor provided inside the operating room 4 of the excavator 1. The management device 61 outputs the determined control matter to the excavator 1. The excavator 1 allows the above-described monitor to display occurrence of the positional displacement of the imaging device 30 based on the control matter acquired from the management device 61. The operator of the excavator 1 having visually confirmed the display on the monitor performs, for example, calibration for the imaging device 30, or requests a service man to adjust the setting position of the imaging device 30. In the case where the management device 61 determines the imaging condition of the imaging device 30, matters to be determined by the management device 61 are not limited to the above-described matters, and determination same as the case where the detection processor 51 includes the determination unit 51PB can be made.

As described above, the management device 61 determines the control matter for the excavator 1 based on the determination result, and transmits the control matter to the excavator 1 via the communication unit 62, but at this point, the management device 61 may transmit the control matter for the excavator 1 to the portable terminal device 64. The operator of the excavator 1 confirms the control matter transmitted to the excavator 1 or portable terminal device 64, and can control the excavator 1.

Further, the management device 61 determines the handling matter based on the determination result, but as an example thereof, a notification may be made to the operator, administrator, or service man. For example, identification information such as a mail address of the portable terminal device 64 like a mobile phone owned by the operator, administrator, or service man is preliminarily registered in a storage device of the management device 61. For example, in the case where the imaging condition is rainy, the management device 61 may transmit, to the portable terminal device 64, a command not to perform refrain from image capturing in bad weather via the communication unit 62 and the antenna 62A. In the case where the determination result is positional displacement of the imaging device 30, dirt on the front glass 4G, dirt on the lens of the imaging device 30, or the like, the management device 61 may transmit a notification urging to inspect the imaging device 30 or a notification urging to clean the front glass 4G to the portable terminal device 64 via the communication unit 62 and the antenna 62A. These notifications that are handling matters based on the determination result are received in the detection processor 51 from the management device 61 via the communication unit 26 of the excavator 1, and may be displayed on a display device, not illustrated, in the excavator 1.

For example, in the case where at least the determination unit 51PB is provided at the management device 61, the management device 61 performs a following process in order to transmit the above-described handling matters to the excavator 1 and the portable terminal device 64. The determination unit 51PB of the management device 61 receives not only the stereo percentage STR transmitted from the excavator 1 but also an IP address of the communication unit 26 of the excavator 1 that transmits the stereo percentage STR. Here, the identification information such as a machine number of the excavator 1 may be transmitted to the management device 61 together with the IP address of the communication unit 26 or instead of the IP address. In this case, the machine number is preliminarily stored in the storage unit 51M of the detection processor 51, and for example, the communication unit 26 reads the machine number from the storage unit 51M and transmits the same to the management device 61. Further, the communication unit 26 of the excavator 1 may transmit, to the management device 61, positional information measured by the GPS when the imaging device 30 captures an image of the object.

In the storage device of the management device 61, the IP address of the communication unit 26 of the excavator 1, IP address of the portable terminal device 64, machine number of the excavator 1, etc. are preliminarily registered. The IP address (or machine number) of the excavator 1 is linked to at least one of the IP address and the mail address of the portable terminal device 64. The determination unit 51PB of the management device 61 searches the storage device of the management device 61 for the IP address of the excavator 1 (communication unit 26) received by the management device 61 together with the stereo percentage STR, and the handling matter is transmitted to the IP address or the mail address of the portable terminal device 64 linked to the IP address obtained through the search. Further, for example, in the case of wishing to display the handling matter on the display device of the excavator 1 as described above, the management device 61 may transmit the handling matter (notification) to the IP address received together with the stereo percentage STR. In this case, information indicating a place of operating site of the excavator 1 may be preliminarily registered in the storage device of the management device 61. The management device 61 makes a search for the registered place of operating site based on the positional information transmitted from the excavator 1, and may transmit a handling matter for the excavator 1 to an administrator and the like at the corresponding operating site.

The detection processor 51 of the excavator 1 determines the imaging condition based on the performance result of stereo measurement, and obtains the handling matter. Then, the detection processor 51 may display at least one of the determination result and the handling matter on the display unit, not illustrated, included inside the excavator 1. Further, the management device 61 determines the imaging condition based on the performance result of stereo measurement transmitted from the excavator 1, and obtains the handling matter based on the determination result. Then, the management device 61 may display at least one of the determination result and the handling matter on a display unit, not illustrated, inside the management facility 60, or may output the same from a printing device, not illustrated, inside the management facility 60.

As described above, the position measurement system 40 and the position measurement method according to the embodiment determine the imaging condition of the imaging device 30 based on the performance result of stereo measurement using at least the pair of imaging device 30 mounted on the excavator 1. Therefore, the position measurement system 40 and the position measurement method according to the embodiment can determine the environment that may influence imaging capturing by the imaging device 30, determine the peripheral environment of the excavator 1, and determine the posture of the imaging device 30 even in the case where the excavator 1 does not include any device for environment observation. Thus, the position measurement system 40 and the position measurement method according to the embodiment can grasp the condition at the time when the imaging device 30 constituting the stereo camera captures an image. Further, the operator of the excavator 1, the administrator of the excavator 1, or the like can grasp the imaging condition of the imaging device 30 by using a result determined by the position measurement system 40 and the position measurement method according to the embodiment.

Therefore, even in the case where the operator captures an image of the object despite a fact that the environment at the time of imaging is the environment that influences image capturing by the imaging device 30, the position measurement system 40 and the position measurement method according to the embodiment can exclude a three-dimensional measurement result based on such image capturing. Further, in the case where the environment at the time of capturing the image is the environment that influences image capturing by the imaging device 30, the position measurement system 40 and the position measurement method according to the embodiment can alert the operator no to perform image capturing as the necessary measure based on the determination result. As the necessary measures based on the determination result, there may be work such as inspecting the imaging device 30 and cleaning the front glass 4G. According to the position measurement system 40 and the position measurement method of this embodiment, necessity of such work can be quickly determined, and the administrator and the like can provide instructions for such inspection and cleaning. As a result, the administrator and the like can obtain appropriate three-dimensional measurement result (topographical information) by the imaging device 30.

The work machine such as the excavator 1 is often operated in a place having a large amount of dust and also likely to be affected by vibration, impact, and the like. Therefore, dust may adhere to the front glass 4G, and positional displacement of the imaging device 30 tends to occur due to vibration and impact. The position measurement system 40 and the position measurement method according to the embodiment can determine an imaging environment of the imaging device 30 and improve the imaging condition of the imaging device 30. The imaging condition is not limited to that of the embodiment and may include, for example, a case where the stereo measurement cannot be performed as a result the work unit 2 is photographed by one of the pair of imaging devices 30, 30.

According to the embodiment, the example of disposing the imaging device 30 inside the operating room 4 has been described, but the imaging device 30 may be disposed outside the operating room 4. Further, the excavator 1 may be capable of operating the work unit 2, swing body 3, and traveling body 5 by remote control. In the case where the excavator 1 can be operated by such remote control, the operating room 4 may not be necessary. In the case where the excavator 1 can be operated by such remote control, a command signal for image capturing may be transmitted to the excavator 1 from a remote place instead of the image capturing command by the imaging switch 32, and for example, the processing unit 51P allows the imaging device 30 to capture an image by the excavator 1 receiving the signal via the communication unit 26.

While the embodiment has been described above, note that the embodiment is not limited to the described content. Further, the components described above may include components readily conceivable by those skilled in the art, components substantially identical, and components in a so-called equivalent range. The components described above can be suitably combined. At least one of various kinds of omission, replacement, and modification can be made for the components in the scope without departing from the gist of the embodiment. As far as the work machine is capable of constructing a construction object by performing excavating, transferring, and the like, the work machine is not limited to the excavator and may also be work machines such as a wheel loader and bulldozer.

REFERENCE SIGNS LIST

1 EXCAVATOR
1B VEHICLE BODY
2 WORK UNIT
3 SWING BODY
4 OPERATING ROOM

4G FRONT GLASS
4W WIPER
5 TRAVELING BODY
23 POSITION DETECTOR
26 COMMUNICATION UNIT
30, 0a, 30b, 30c, 30d, 30L, 30R IMAGING DEVICE
32 IMAGING SWITCH
33 DISPARITY IMAGE
35 OPERATION UNIT
40 POSITION MEASUREMENT SYSTEM
41 CONTROLLER
50 CONTROL SYSTEM
51 DETECTION PROCESSOR
51IO INPUT/OUTPUT UNIT
52M STORAGE UNIT
51P PROCESSING UNIT
51PA CALCULATION UNIT
51PB DETERMINATION UNIT
51PC INFORMATION GENERATION UNIT
55 SIGNAL LINE
60 MANAGEMENT FACILITY
61 MANAGEMENT DEVICE
62 COMMUNICATION UNIT
64 PORTABLE TERMINAL DEVICE

The invention claimed is:

1. A position measurement system comprising:
at least a pair of imaging devices mounted on a work machine;
a calculation unit provided at the work machine and configured to perform stereo measurement by using information of an image of an object captured by at least the pair of imaging devices and obtain a stereo percentage which is a ratio of a number of pixels where the stereo measurement is successfully performed to a number of pixels of an image obtained as a result of performing an image processing by a stereo system in the stereo measurement, or a ratio of a number of pixels where the stereo measurement is successfully performed to a number of pixels in a range where a pattern is located of an image obtained as the result of performing the image processing by the stereo system in the stereo measurement; and
a determination unit configured to acquire the stereo percentage of the stereo measurement at different timing and determine condition related to image capturing by the imaging devices based on time-series variation of the stereo percentage and determine that when the stereo percentage is reduced temporarily, a reason for the reduced stereo percentage is a peripheral environment.

2. The position measurement system according to claim 1, wherein the calculation unit is configured to perform stereo measurement for a specific range where a pattern is located inside the image.

3. The position measurement system according to claim 1, wherein the determination unit is configured to determine a state between the imaging device and an object captured by the imaging device based on the stereo percentage.

4. The position measurement system according to claim 1, wherein the determination unit is configured to determine a posture of the imaging device based on the stereo percentage.

5. The position measurement system according to claim 1, wherein at least the pair of imaging devices having an optical axis oriented upward is disposed.

6. The position measurement system according to claim 1, wherein
the determination unit is provided at a management device outside the work machine, and
the calculation unit is configured to output the performance result of the stereo measurement to the determination unit provided at the management device.

7. The position measurement system according claim 6, wherein the management device is configured to determine a handling matter based on the determination result on the condition related to image capturing.

8. The position measurement system according to claim 1, wherein the determination unit is provided at the work machine.

9. The position measurement system according to claim 8, wherein the work machine includes a control unit configured to determine a handling matter based on the determination result on the condition related to image capturing.

10. The position measurement system according to claim 1, wherein the determination unit is configured to determine that correction is possible by calibration of the imaging device when the stereo percentage is a first threshold value or less, and determine that correction of a setting state of the imaging device is necessary when the stereo percentage is equal to or smaller than a second threshold value smaller than the first threshold value.

11. A work machine comprising:
the position measurement system according to claim 1;
a vehicle body including a traveling body; and
a work unit mounted on the vehicle body.

12. A position measurement system comprising:
at least a pair of imaging devices mounted on a work machine;
a calculation unit provided at the work machine and configured to perform stereo measurement by using information of an image of an object captured by at least the pair of imaging devices and obtain a stereo percentage which is a ratio of a number of pixels where the stereo measurement is successfully performed to a number of pixels of an image obtained as a result of performing an image processing by a stereo system in the stereo measurement, or a ratio of a number of pixels where the stereo measurement is successfully performed to a number of pixels in a range where a pattern is located of an image obtained as the result of performing the image processing by the stereo system in the stereo measurement; and
a determination unit configured to acquire the stereo percentage of the stereo measurement at different timing and determine condition related to image capturing by the imaging devices based on time-series variation of the stereo percentage and determine that when the stereo percentage is continuously reduced, a reason for the reduced stereo percentage is dirt on a front glass, or dirt on a lens of the imaging device.

13. A position measurement system comprising:
at least a pair of imaging devices mounted on a work machine;
a calculation unit provided at the work machine and configured to perform stereo measurement by using information of an image of an object captured by at least the pair of imaging devices and obtain a stereo percentage which is a ratio of a number of pixels where the stereo measurement is successfully performed to a number of pixels of an image obtained as a result of performing an image processing by a stereo system in the stereo measurement, or a ratio of a number of pixels where the stereo measurement is successfully performed to a number of pixels in a range where a pattern is located of an image obtained as the result of performing the image processing by the stereo system in the stereo measurement; and a determination unit configured to acquire the stereo percentage of the stereo measurement at different timing and determine condition related to image capturing by the imaging devices based on time-series variation of the stereo percentage and determine that when the stereo percentage is reduced, a setting state of the imaging device is not appropriate.

* * * * *